United States Patent [19]
Flournoy et al.

[11] 3,858,656
[45] Jan. 7, 1975

[54] OIL RECOVERY PROCESS USABLE IN FORMATIONS CONTAINING WATER HAVING HIGH CONCENTRATIONS OF POLYVALENT IONS

[75] Inventors: Kenoth H. Flournoy; Jim Maddox, Jr.; Jack F. Tate, all of Houston, Tex.

[73] Assignee: Texaco Inc., New York, N.Y.

[22] Filed: Dec. 3, 1973

[21] Appl. No.: 421,176

[52] U.S. Cl. ................................. 166/274, 166/273
[51] Int. Cl. .......................................... E21b 43/22
[58] Field of Search .......................... 166/273–275, 166/305 R, 268, 270; 252/8.55 D

[56] References Cited
UNITED STATES PATENTS

| | | | |
|---|---|---|---|
| 3,254,714 | 6/1966 | Gogarty et al. | 166/274 |
| 3,468,377 | 9/1969 | Dunlap et al. | 166/274 |
| 3,469,630 | 9/1969 | Hurd et al. | 166/273 X |
| 3,498,379 | 3/1970 | Murphy | 166/273 X |
| 3,623,553 | 11/1971 | Burdge | 166/274 X |
| 3,739,848 | 6/1973 | Lawson et al. | 166/274 |
| 3,768,560 | 10/1973 | Hill et al. | 166/273 X |
| 3,788,399 | 1/1974 | Feuerbacher et al. | 166/273 X |
| 3,811,504 | 5/1974 | Flournoy et al. | 166/273 |
| 3,811,505 | 5/1974 | Flournoy et al. | 166/274 |
| 3,811,507 | 5/1974 | Flournoy et al. | 166/274 |

*Primary Examiner*—Stephen J. Novosad
*Attorney, Agent, or Firm*—T. H. Whaley; C. G. Ries

[57] ABSTRACT

A dual surfactant system usable in the presence of from about 200 to about 18,000 parts per million polyvalent ions, such as calcium and/or magnesium, and a method of using said surfactant system for recovering petroleum from subterranean formations, said surfactant system comprising water soluble salts of alkyl or alkylaryl sulfonates wherein the alkyl chain may have from five to 25 carbon atoms; plus sulfated oxyalkylated surfactants containing arylalkyl groups.

23 Claims, 5 Drawing Figures

OIL RECOVERY PROCESS USABLE IN FORMATIONS CONTAINING WATER HAVING HIGH CONCENTRATIONS OF POLYVALENT IONS

BACKGROUND OF THE INVENTION

1. Field of the Invention

This invention relates to a method for recovering petroleum from subterranean petroleum containing formations, and more particularly to a surfactant flooding method for recovering petroleum from petroleum containing formations. Still more particularly, this invention pertains to a novel surfactant mixture which will function effectively in the presence of formation water containing high polyvalent ion concentrations, e.g., high calcium or magnesium concentrations, which cause precipitation of conventional surfactants, and to a method for using such novel surfactant composition in a surfactant flooding process for recovering petroleum.

2. Description of the Prior Art

Petroleum is normally recovered from subterranean formations in which it has accumulated by penetrating said formation with one or more wells and pumping or permitting the petroleum to flow to the surface through these wells. Recovery of petroleum from petroleum containing formations is possible only if certain conditions are satisfied. There must be an adequately high concentration of petroleum in the formation, and there must be sufficient porosity and permeability or interconnected flow channel throughout the formation to permit the flow of fluids therethrough if sufficient pressure is applied to the fluid. When the subterranean petroleum containing formation has natural energy present in the form of an underlying active water drive, or gas dissolved in the petroleum which can exert sufficient pressure to drive the petroleum to the producing well, or a high pressure gas cap above the petroleum within the petroleum reservoir, this natural energy is utilized to recover petroleum. Recovery of petroleum by utilization of natural energy is referred to as primary recovery. When this natural energy source is depleted, or in the instance of those formations which do not originally contain sufficient natural energy to permit primary recovery operations, some form of supplemental recovery process must be utilized in order to extract petroleum from the subterranean petroleum containing formation. Supplemental recovery is frequently referred to as secondary recovery, although in fact it may be primary, secondary or tertiary in sequence of employment.

Water flooding, which involves the injection of water into the subterranean, petroliferous formation for the purpose of displacing petroleum toward the producing well, is the most economical and widely practiced supplemental recovery method. Water does not displace petroleum with high efficiency, however, since water and oil are immiscible, and also because the interfacial tension between water and oil is quite high. Persons skilled in the art of oil recovery have recognized this weakness of water flooding and many additives have been described in the prior art for decreasing the interfacial tension between the injected water and the formation petroleum. For example, U.S. Pat. No. 2,233,381 (1941) disclosed the use of polyglycol ether as a surface active agent or surfactant to increase the capillary displacement efficiency of an aqueous flooding medium. U.S. Pat. No. 3,302,713 discloses the use of petroleum sulfonate prepared from the 850° to 1050°F. boiling range fraction of petroleum crude as a surfactant for use in oil recovery operations. U.S. Pat. No. 3,468,377 (1969) describes the use of petroleum sulfonates of a specified molecular weight for oil recovery. Other surfactants which have been proposed for oil recovery include alkyl sulfates and alkyl sulfonates.

The above described surfactants are satisfactory for surfactant flooding in petroliferous formations only if the calcium and magnesium concentration of the formation water is below about 500 parts per million. Petroleum sulfonate is one of the most popular and desirable surfactants because of its high surface activity and low unit cost, although it also suffers from the limitation that it can be used only when the total formation water hardness (calcium + magnesium) is less than about 500 parts per million. If the formation water calcium and/or magnesium content exceeds about 500 parts per million, petroleum sulfonates precipitate rapidly. When precipitation of the added material occurs, not only is the desired beneficial result lost, but plugging of the formation will very likely result.

Many subterranean petroleum containing formations are known to exist which contain polyvalent ions such as magnesium and calcium in concentrations far in excess of 500 parts per million. The most common of such reservoirs are limestone formations which may have polyvalent ion concentrations from 200 to as high as 20,000 parts per million in the original connate water, and the formation water after the formation has been subjected to flooding with fresh water may have concentrations of calcium and/or magnesium from about 500 to about 15,000 parts per million. Since surfactants usable for oil recovery operations precipitate when exposed to aqueous environments having a total hardness in excess of about 500 parts per million, such surfactants could not be used in limestone reservoirs. If an aqueous solution of petroleum sulfonate, for example, were injected into a limestone reservoir, the petroleum sulfonate would precipitate immediately on contacting the high calcium containing formation water. In such a process, the flood water would have essentially no surfactant present in it to decrease the interfacial tension between water and petroleum. Furthermore, precipitated petroleum sulfonate plugs the small flow channels in the subterranean petroleum containing formation, decreasing the formation porosity and injectivity, thereby causing a substantial decrease in the oil displacement efficiency.

In U.S. Pat. No. 3,508,612, J. Reisberg et al., 1970, an oil recovery method employing a mixture of sulfonates, specifically petroleum sulfonates and sulfated ethoxylated alcohol is disclosed which results in improved oil recovery in the presence of high concentrations of polyvalent ions including calcium. Field application of petroleum sulfonate has revealed numerous problems associated with the heterogeneous nature of the oleophilic moieties present. Specifically in a paper presented at the Society of Petroleum Engineers, Fall 1972, meeting held in San Antonio, the problem of fractionation of the petroleum sulfonate surfactant was noted. The paper, SPE 4084, is titled "Borregas Surfactant Pilot Test" By Messrs. S. A. Pursley and H. L. Graham. In the paper it is stated that "The higher equivalent weight materials were selectively absorbed on the mineral surfaces of the rock" and "the higher equivalent weight portions of the [petroleum sulfonate] surfactant are the prime contributors to low interfacial tensions that permit mobilization of residual oil." Thus a unique problem is recognized in the use of petroleum sulfonate in that the most effective portions of petroleum sulfonate are selectively removed from aqueous solution by absorption on the rock surface and/or partitioning into the oil phase.

The Reisberg patent states that a concentration lower limit of 1 percent surfactant is mandatory. Our surfactant combination may be used very effectively at a much lower concentration.

Nonionic surfactants, such as polyethoxylated alkyl phenols, polyethoxylated aliphatic alcohols, carboxylic esters, carboxylic amides, and polyoxyethylene fatty acid amides, have a somewhat higher tolerance of polyvalent ions such as calcium or magnesium than do the more commonly utilized anionic surfactants. While it is technically feasible to employ a nonionic surfactant solution to decrease the interfacial tension between the injected aqueous displacing medium and petroleum contained in some limestone formations, such use would not be economically feasible for several reasons. Nonionic surfactants are not as effective on a per unit weight basis as are the more commonly used anionic surfactants, and furthermore, the nonionic surfactants have a higher cost per unit weight than do the anionic surfactants.

Thus it can be seen that while many surfactants have been proposed for supplemental oil recovery use, there is a substantial, unfulfilled need for a surfactant composition usable in the presence of formation waters containing calcium and/or magnesium in excess of 500 parts per million.

SUMMARY OF THE INVENTION

This invention pertains to a novel dual surfactant system and to a method for recovering petroleum from subterranean petroleum containing formations by the use of such surfactant system, said petroleum containing formation also containing water having a polyvalent ion content, for example calcium and/or magnesium, in the range of from about 200 to about 18,000 parts per million. The novel surfactant system is comprised of an aqueous solution of from about 0.05 to about 5.0 percent by weight of an anionic surfactant such as a water soluble salt of an alkyl or an alkylaryl sulfonate, for example sodium dodecylbenzene sulfonate, plus from about 0.05 to about 5.0 percent by weight of a sulfated oxyalkylated surfactant containing arylalkyl groups. From about 2 percent pore volume to about 50 percent pore volume of the surfactant solution is injected into the formation. The surfactant solution may be displaced through the formation by injecting water, or it may be followed immediately by a quantity of thickened water such as is formed by mixing a small amount of a hydrophilic polymer such as polyacrylamide or polysaccharide in water to increase its viscosity, which is in turn displaced through the formation with water. Our invention therefore incorporates the novel surfactant system, and the method of using said surfactant system for the recovery of petroleum from subterranean petroleum containing formations having a polyvalent ion concentration in the formation water from about 500 to about 18,000 parts per million.

DESCRIPTION OF THE PREFERRED EMBODIMENTS

This invention concerns a novel, multiple surfactant system which can be used in subterranean petroleum containing formations which also contain "hard water," or water having polyvalent ions such as calcium and/or magnesium dissolved therein in a concentration of from about 200 to about 18,000 parts per million. There are many petroleum containing formations which contain water having calcium and/or magnesium concentrations in the range from about 200 to about 18,000 parts per million; the most common of such formations being limestone formations. These formations frequently contain a substantial amount of petroleum after primary production and even after water flooding, but surfactant flooding cannot be employed in them because surfactants previously proposed for oil recovery are insoluble or otherwise ineffective in the presence of calcium and/or magnesium in the range of from 200 to 18,000 parts per million.

We have found that an aqueous solution of two surfactant materials, in a critical concentration range, will effectively reduce the interfacial tension between oil and water, and will function effectively in the presence of calcium and magnesium in a concentration of from about 200 to about 18,000 parts per million total hardness. The dual surfactant system comprises

1. A sulfonated surfactant with average molecular weight not to exceed about 360 having one of the following general formulas:

$$[R-X] Y$$

wherein R is an alkyl radical, linear or branched, having from five to 25 and preferably from eight to 14 carbon atoms, X is an oxygen containing anionic radical, a sulfonate (SO$_3$), and Y is a monovalent cation such as sodium, potassium or ammonium, or

(b)

wherein R, X and Y have the same meaning as above. For example, if R is linear dodecyl, X is sulfonate and Y is ammonia, the material is ammonium dodecylbenzene sulfonate.

2. A sulfated oxyalkylated surfactant of the general formula:

(a)

wherein R' is an alkyl radical having from five to 20 and preferably eight to 14 carbon atoms, N is an integer from 1 to 10, and W is a cation such as sodium, potassium or ammonium.

The term surfactant encompasses a broad spectrum of materials which share the following common characteristics:

1. The compound must be at least slightly soluble in at least one phase of a liquid system,
2. The compound must have an amphipathic structure (the molecule is composed of groups with opposing solubility tendencies). For use in oil recovery operations, the molecule must have at least one hydrophobic or oil soluble group and at least one hydrophilic or water soluble group.
3. The surfactant molecules or ions must form oriented monolayers at phase interfaces.
4. The equilibrium concentration of the surfactant in any particular solute at the phase interface is greater than the concentration of the surfactant in the bulk of the solution.
5. The material must tend to form micelles or aggregates of molecules or ions whenever the concentration exceeds a certain limiting value which is a characteristic of the particular surfactant and solute.
6. The material must exhibit some combination of the following functional properties: detergency, foaming, wetting, emulsifying, solubilizing and dispersing.

Surfactants are generally classified on the basis of the type of hydrophilic or water soluble group or groups attached to the molecule, generally being classified as anionic, cationic or nonionic, as described below more fully.

1. Anionic surfactants are those surfactant materials wherein the hydrophilic or water soluble group is a carboxylate, sulfonate, sulfate or phosphate group. This is the most important class of surfactants. Anionic surfactants are readily available, inexpensive, and have a high degree of surface activity. Petroleum recovery operations will generally involve the use of anionic surfactants unless there is some objection to the use of anionic surfactants, or some sufficient reason to resort to the use of some other compound. Petroleum sulfonates are currently very popular anionic surfactants for oil recovery, and are prepared by isolating a preselected boiling range fraction of a crude oil and subjecting it to sulfonation. Although this material is desirable for use because of its low unit cost, there are problems associated with the use of petroleum sulfonates because of the complex nature of the hydrophobic or oil soluble portion of the molecule, as well as the limited tolerance for calcium and magnesium. Consequently petroleum sulfonates are not preferred for use in our invention.

2. Cationic surfactants employ primary, secondary, or tertiary amines, or quaternary ammonium groups, as the hydrophilic or water soluble group.

3. Nonionic surfactants are materials which have no charge when the material is dissolved in an aqueous medium. The hydrophilic tendency is derived from oxygen atoms in the molecule which hydrate by hydrogen bonding to water molecules present in the solute. The strongest hydrophilic moiety in this class of surfactants is the ether linkage, and there must be a plurality of these linkages present to render the compounds sufficiently water soluble to permit the compound to exhibit surface activity. Polyoxyethylene surfactants having the following recurring ether linkages are examples of hydrophilic moieties for nonionic surfactants:

$$-CH_2-CH_2-O-CH_2-CH_2-O-$$

A nonionic surfactant molecule may have more than one chain containing ether linkages and generally as much as 60 to 70 percent by weight of the molecule must be in the form of ether linkage containing chains in order to render the molecule sufficiently water soluble for it to function as a surfactant. It can be readily seen that the pressure of these large chains containing the ether linkages in addition to the relatively long aliphatic or other hydrophobic chains results in a high molecular weight compound, and this is the reason that nonionic surfactants have a low surface activity per unit weight of material.

Nonionic surfactants are more efficient in the presence of high concentrations of calcium and magnesium than are either anionic or cationic surfactants, and it is possible to conduct a surfactant flood operation in a subterranean limestone formation or other subterranean petroleum containing formation wherein the formation water contains substantial quantities of calcium and/or magnesium, about 200 parts per million, although they cannot tolerate calcium and/or magnesium levels of the upper part of the hardness range encountered in limestone formations. Nonionic surfactants are also not particularly desirable for use as the sole surfactant because of their high cost per unit weight and low surface activity.

The optimum concentration of each material which constitutes the novel surfactant system of our invention will vary to a degree depending on the hardness and other characteristics of the aqueous environment in which it is to be used. Ideally, this should be determined by test utilizing the actual formation water in which the material will be used. Generally from about 0.05 percent to about 5.0 percent and preferably from about 0.2 to about 0.5 percent by weight of the sulfonated surfactant and from about 0.05 to about 5.0 percent and preferably from about 0.2 to 0.5 percent by weight of the sulfated surfactant will be effective within the 200 to 18,000 parts per million hardness range of the aqueous environment. The ratio of sulfonated to sulfated surfactant may range from 8 to 1 or 1 to 8.

In the practice of our invention, from about 2 to about 50 pore volume percent of an aqueous solution containing from about 0.05 to about 5.0 percent and preferably from about 0.2 to about 0.5 percent of a sulfonated surfactant and from about 0.05 to about 5.0 percent and preferably from about 0.2 to about 0.5 percent by weight of the sulfated surfactant, is injected into the subterranean petroleum containing formation. The subterranean petroleum containing formation to which this invention will be applied will ordinarily be a limestone formation, although any formation having water containing from about 200 to about 18,000 parts per million calcium and/or magnesium can effectively be exploited by means of the subject process. Ordinarily, water injection will have been applied to the reservoir first, although this is not a requirement for the employment of this invention. Water injection or water flooding is, however, a desirable first phase of the recovery program for several reasons. It is less expensive to conduct than the surfactant flooding program, and furthermore, the injection of relatively fresh water into a formation containing connate water having high concentrations of calcium and/or magnesium will result in the lowering of the connate water hardness to a point where a chosen surfactant composition will operate more effectively. As will be seen later hereinafter in this specification, it is not necessarily to be expected that the optimum interfacial tension reduction will be achieved at the lowest possible total hardness. This furnishes still another reason for the desirability that actual experimentation be undertaken utilizing the available formation water or a relatively close facsimile thereof, to determine the optimum surfactant composition and also the optimum hardness at which the chosen composition will function. In formations wherein it is known or expected that surfactants will be adsorbed from solution onto the formation rock, it is necessary either to use a preflush of sacrificial inorganic material such as sodium carbonate or sodium polyphosphate or to use more than the optimum concentration of surfactant as determined by capillary tests or other means. It is generally satisfactory to use up to 5 percent by weight surfactant, and this surplus material need only be added to the first ten percent or so of the surfactant slug injected. Both surfactants may tend to adsorb onto the formation, or there may be a preferential adsorption of either the sulfonated or sulfated surfactant used, depending on the characteristics of the formation rock.

If the viscosity of the petroleum contained in the subterranean formation is sufficiently high, the ratio of viscosities of injected fluid to displaced fluid, or mobility ratio as it is referred to in the art of supplemental oil recovery, will result in an adverse sweep efficiency, and so it will be preferable to utilize some type of additive to increase the viscosity of the injected aqueous fluid to more nearly match the viscosity of the subterranean petroleum. Hydrophilic polymers such as polyacrylamides or polysaccharides are effective for this purpose in a concentration from about 100 to about 5000 parts per million in an aqueous solution. The use of this amount of polymer results in a fluid having an apparent viscosity of from about 5 to about 15 centipoise, which will generally improve the mobility ratio to a point that improved sweep efficiency can be achieved. It may be desirable to add a small concentration of the hydrophilic polymer to the surfactant solution, but it is generally satisfactory to follow the surfactant solution with a mobility buffer which comprises an aqueous solution of the hydrophilic polymer. This mobility buffer itself is then displaced through the formation by injecting water into the formation. Whether or not the mobility buffer solution is used, the final phase of the supplemental oil recovery operation will comprise the injection of water into the formation to displace the surfactant solution and the displaced oil through the formation to the producing well. Water injection will be continued until the water/oil ratio at the producing well rises to about 30 to 40. Alternatively, the aqueous surfactant solution may be followed by a gas, a gas in combination with an aqueous fluid, or a gas-containing aqueous fluid having sufficient polymer to increase the viscosity thereof.

The invention can be more fully understood by reference to the following field example, which is offered only for purpose of illustration and is not intended to be limitative or restrictive of the invention, which will be defined more precisely hereinafter in the claims.

FIELD EXAMPLE

A subterranean, petroleum containing limestone formation is found at a depth of 9500 feet. The limestone formation is 40 feet thick and the porosity is 30 percent. The field is exploited first by primary production, utilizing a square grid pattern with 400 foot line spacing between wells. At the conclusion of primary recovery, which recovers only 25 percent of the original petroleum in place within the reservoir, injection wells are drilled in the center of each square grid to convert the field to an inverted five spot pattern for water injection. Although a large field entails a multiplicity of the square grid patterns, each 400 feet on a side and with an injection well in the center, it is possible to analyze the entire field by considering only a single grid unit. Water is injected into the injection well and production of oil is continued from the production wells until the water/oil ratio reaches 30, which is considered to be the economic limit for continued production. At the conclusion of the water flooding operation, only 45 percent of the original oil in place in the reservoir has been recovered, and some form of tertiary recovery operation must be resorted to in order to obtain any significant portion of the remaining petroleum. The formation water is analyzed and found to contain 8,000 parts per million calcium and 6,000 parts per million magnesium. Capillary displacement tests are performed using actual formation water and it is determined that the maximum capillary displacement results from the use of 0.30 percent by weight of the ammonium salt of dodecylbenzene sulfonic acid, and 0.30 percent by weight of the sulfated four mole ethylene oxide adduct of nonyl phenol. Since the formation is known to adsorb both surfactants, the first 10 percent of the surfactant slug will contain 2 percent by weight of surfactant, and the remainder of the slug will contain 0.45 percent of each material.

Since the pattern used results in 70 percent sweep efficiency, the total pore volume swept by injected fluid is 400 Ft. × 400 Ft. × 40 Ft. × 0.30 × 0.70 = 1,344,000 Cu. Ft.

A 10 percent pore volume surfactant slug or 134,000 cu. ft. or 1,047,000 gallons is used. The first 10 percent of this slug, or 104,700 gallons contains 2 percent by weight of material. The balance contains 0.45 percent of the anionic surfactant and 0.45 percent of the nonionic surfactant. The surfactant solution is followed by injecting 1,000,000 gallons of an aqueous solution containing 500 parts per million of polysaccharide, a hydrophilic polymer, to increase the viscosity of the injected aqueous fluid to about 8 centipoise. Finally, water is injected into the formation to displace the surfactant, thickened water solution, and the displaced oil through the formation toward the production wells. Water injection is continued until the water/oil ratio rises to about 30, at which point the residual oil saturation is reduced 15 percent and approximately 73 percent of the original oil in place is recovered.

EXPERIMENTAL

In order to establish the operability of this invention, and further to determine the optimum ratio of the essential constituents of the novel surfactant composition of our invention, the following experimental work was performed.

LABORATORY CORE DISPLACEMENT

A limestone core, obtained from the Canyon Reef formation, was cleaned by extraction with toluene-methanol, dried, weighed and mounted within a rubber sleeve contained in a holder which permitted fluid to flow through the core.

Next, the core was saturated with an aqueous solution which was 0.2 percent (2000 ppm) in calcium ion, and weighed.

Following this the core was flooded with crude oil until no further passage of water was evidenced, and weighed.

Water-flooding was conducted with the aqueous calcium brine (2000 $Ca^{++}$) until no more oil was displaced. The core was weighed.

Flooding with an aqueous surfactant mixture was conducted. The system consisted of 0.25 percent ammonium dodecylbenzene sulfonate and 0.25 percent sulfated four mole ethylene oxide adduct of nonyl phenol and 0.2 percent (2000 ppm) in calcium ion. The core was finally weighed.

Core pore volume and water saturation ($S_w$) (and hence oil saturation ($S_o$)) after flooding with the various media were calculated from the core weight differences and densities of the brine and oil by means of the formula:

$$\%S_w = [(\text{Wt. Core Containing Oil} + \text{Brine})/(\text{Pore Volume} - \phi \text{Oil} \times 100)]/(\phi \text{Brine} - \phi \text{Oil})$$

where $\phi$ is density.

Results are tabulated below for duplicate experiments.

TABLE I

| After Operation | $\%S_w$ | $\%S_o$ |
| --- | --- | --- |
| 1) Calcium brine flood | — | — |
| 2) Oil flood | 18.8; 28 | 81.2; 72 |
| 3) Calcium brine flood | 61; 72 | 39; 28 |
| 4) Surfactant flood | 86; 86 | 14; 14 |

The ability of the disclosed system to displace oil from a hard water flooded core is manifest. In the first experiment, oil saturation was reduced 25 percent and in the second 14 percent by flooding with the disclosed surfactant system.

CAPILLARY DISPLACEMENT TESTS

Capillary (thin tube) displacement tests provide a convenient and accurate method for determining the optimum concentration of surfactants and the optimum hardness and salinity ranges for the chemical system employed. The tests are performed by filling a number of closed end capillary tubes with the particular crude oil being studied, and submerging the capillary tubes horizontally into the desired aqueous phase. In the instance of the subject series of tests, the aqueous phase comprised the indicated mixture of synthetic connate water in fresh water plus the surfactant mixture being evaluated. In each instance of displacement of oil by the aqueous phase, a meniscus is formed at the oil-water interface. The only force tending to displace oil from the capillary tube was the force resulting from the difference in specific gravities of the two fluids. This force was offset by the interfacial tension between the oil and formation water, and it was observed that essentially no displacement occurred in the instance of connate water — fresh water blends having no surfactant added thereto. When the surfactant composition was successful in producing a movement in the meniscus, the distance traveled by the meniscus in millimeters in a 5 minute exposure interval in the chemical system is recorded, and it is this displacement in millimeters that is plotted in the attached figures, which will be described more fully below. There was essentially no displacement of the meniscus in the instance of capillary tubes submerged in the formation water containing no surfactant of any kind, indicating that the interfacial tension between the crude oil and the formation water was too great to permit displacement of the oil from the capillary. The optimum reduction in interfacial tension is indicated by the maximum value of the displacement observed in the capillary tubes.

Alkylaryl Sulfonate Alone

In an aqueous environment having 3,000 ppm calcium ions and 900 ppm magnesium ions, 0.4 percent of the ammonium salt of a a lauryl benzene sulfonate was used in a capillary displacement test. No displacement was noted and immediate precipitation of the sulfonate was observed.

Sulfated Oxyalkylated Surfactant Containing Alkyl or Alkylaryl Groups Alone

In an aqueous environment having 6,000 ppm calcium ions and 2000 ppm magnesium ions, 0.4 percent of a sulfated six mole ethylene oxide adduct of nonyl phenol was used in a capillary displacement test. No displacement was noted.

Figure 1:
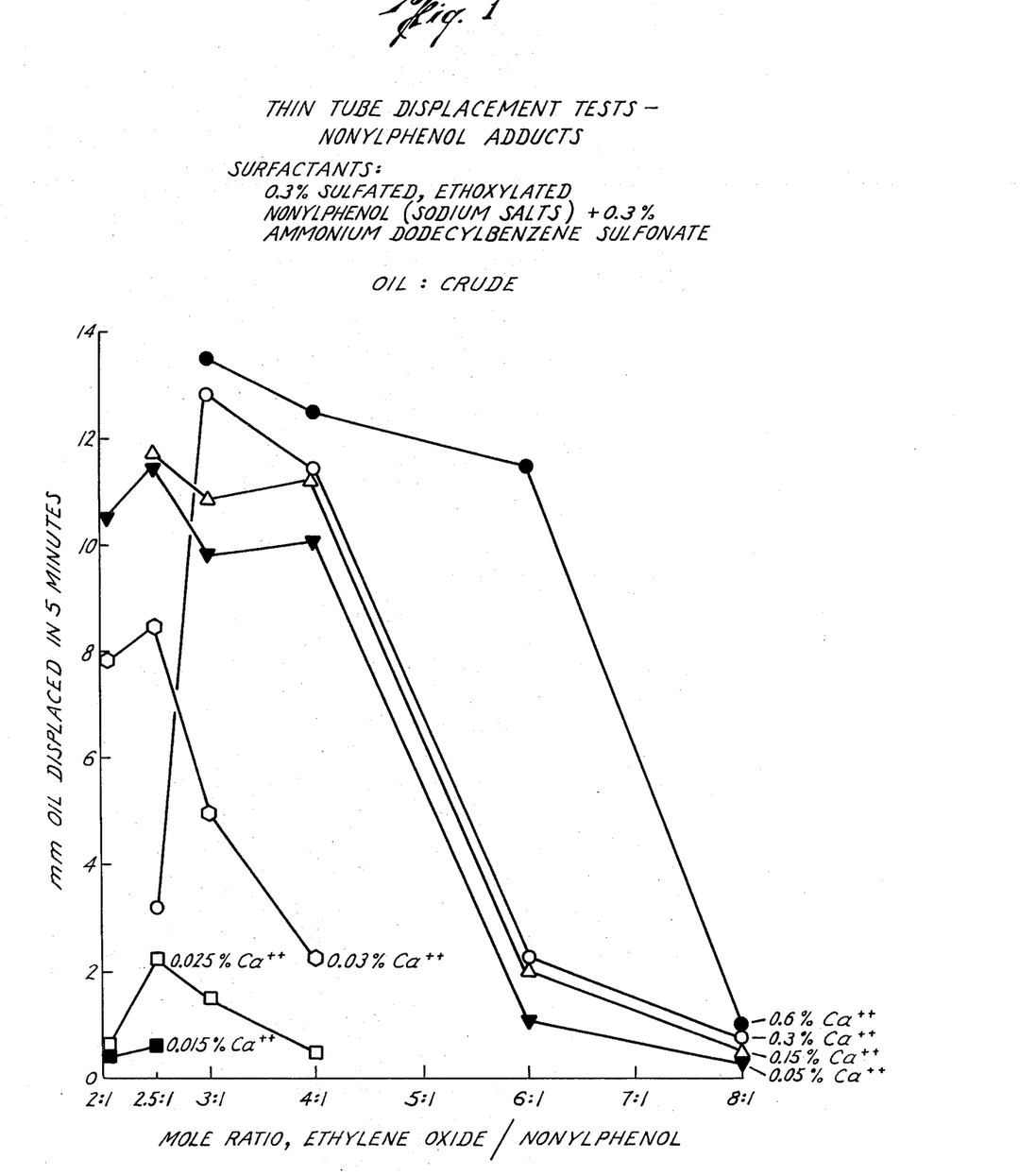
FIG. 1 depicts the effect on capillary (thin tube) displacement tests of varying the mole ratio of ethylene oxide chain length in sodium salts of sulfated nonyl phenol.

FIG. 1 depicts the effect of varying the mole ratio of ethylene oxide chain length in the sodium salts of sulfated nonyl phenol (N.P.) at various hardness levels. The hardness levels ranged from 500 ppm calcium ions ($Ca^{++}$) to 6000 ppm calcium ions. Ammonium dodecylbenzene sulfonate was used in every case in conjunction with the sulfate products.

Figure 2:
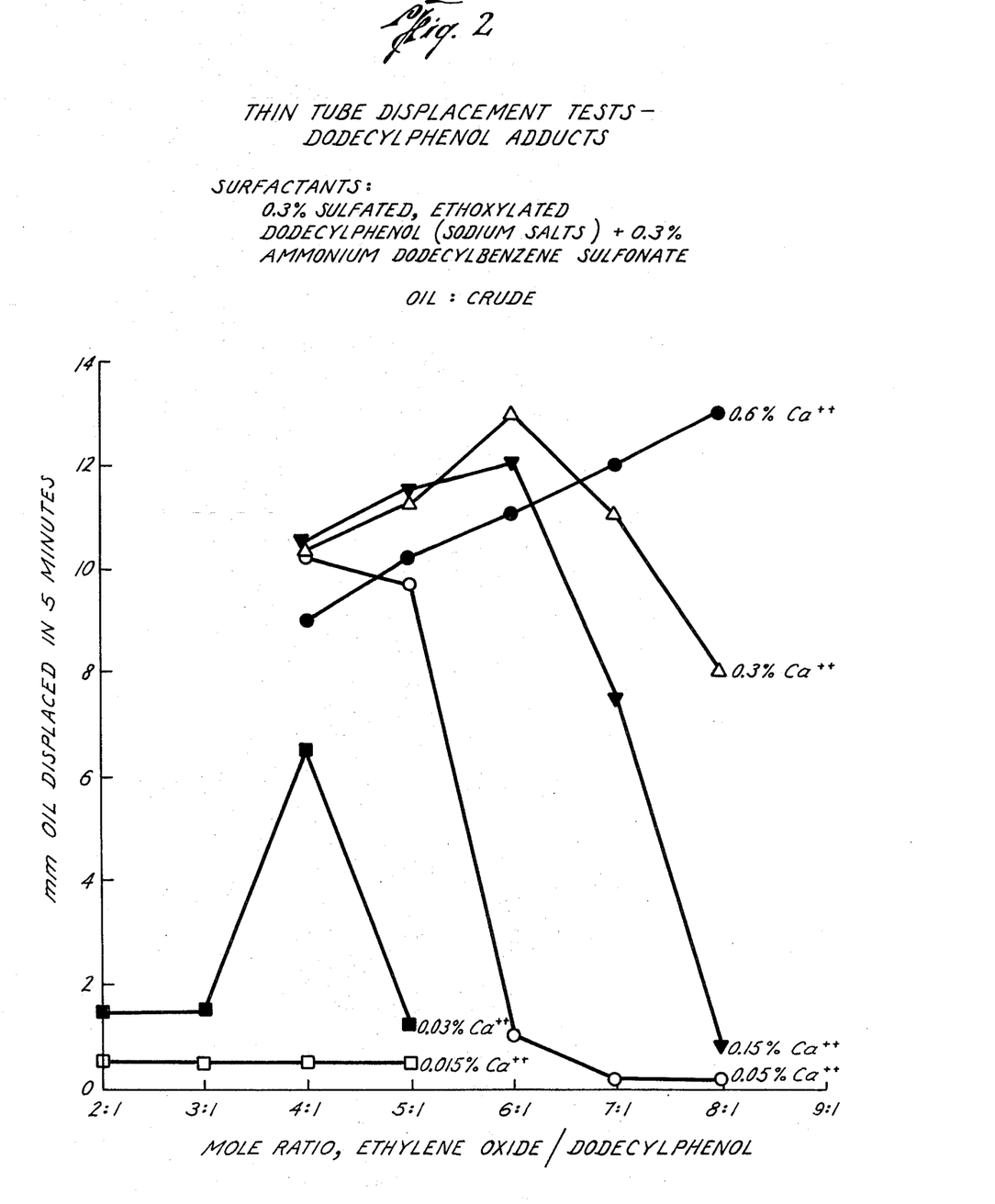
FIG. 2 is similar to FIG. 1 except that sodium salts of dodecyl phenol were used.

FIG. 2 depicts similar tests using sodium salts of dodecyl phenol (D.P.).

At $Ca^{++}$ concentrations below 0.05 percent (500 ppm), oil was displaced most efficiently by surfactants with E.O./alkylphenol ratios of approximately 2.5:1 and 4:1 for N.P. (FIG. 1) and D.P. (FIG. 2) adducts, respectively. For $Ca^{++}$ concentrations between 0.05–0.3 percent, the most effective ratios for adducts were 3:1–4:1 for N.P. and 5:1–6:1 for D.P. At 0.6 percent $Ca^{++}$, N.P. adducts with low ratios appeared most effective, whereas with D.P. adducts, the highest ratio (8:1) was most effective. Other factors, e.g., poor calcium tolerance, might preclude use of low ratio N.P. adducts in water containing high calcium concentrations. The thin tube tests also indicated that none of the surfactant systems displaced oil rapidly when $Ca^{++}$ concentration was less than approximately 0.03 percent (300 ppm).

Figure 3:
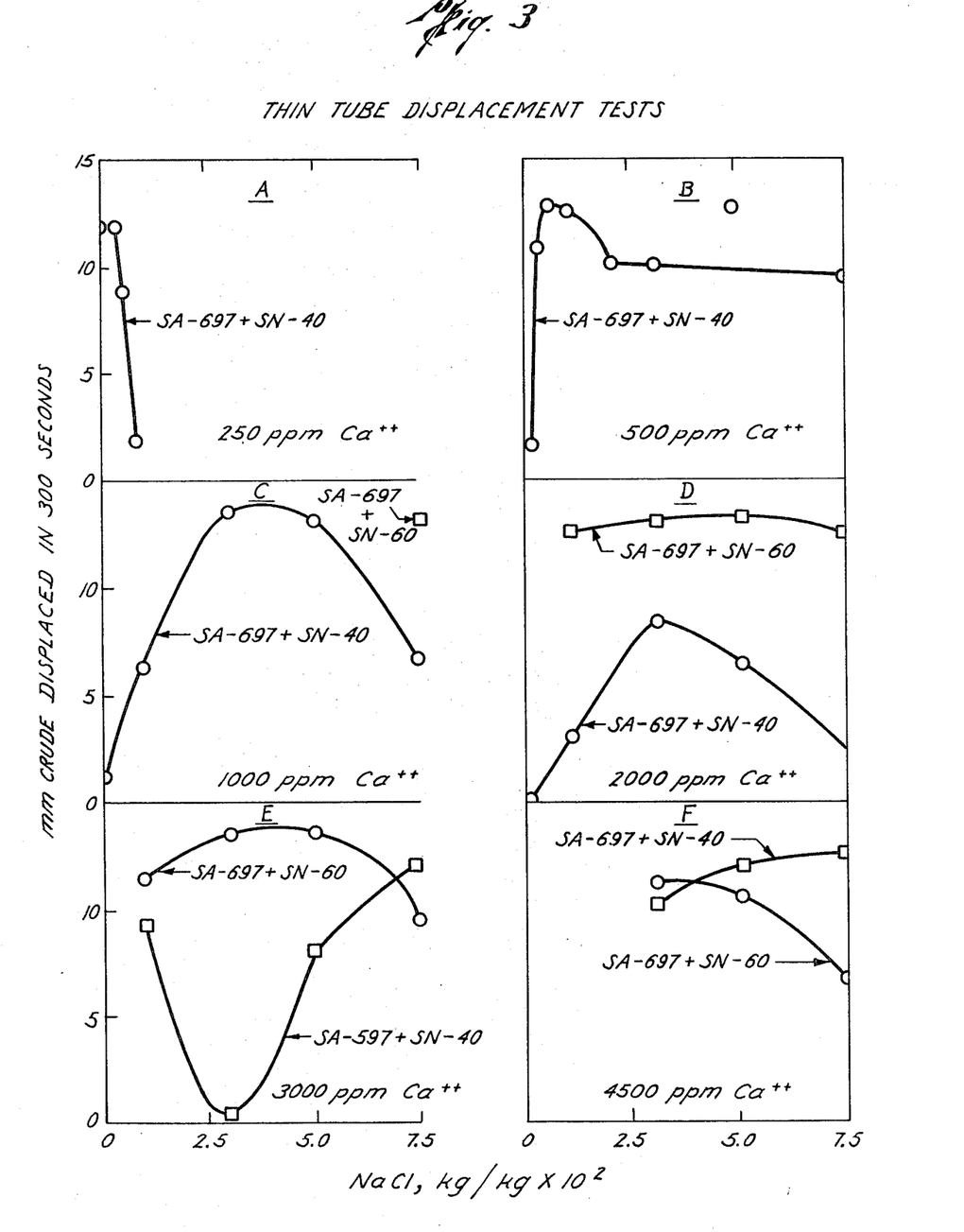
FIG. 3 depicts the effect on capillary displacement tests of calcium ion and sodium ion concentrations.

FIG. 3 depicts a series of tests which indicated the effects of both $Ca^{++}$ and sodium ion ($Na^+$) on the dual surfactant system in capillary (thin tube) displacement tests.

Thin tube displacement of crude oil by selected dual surfactant systems was found to be influenced by both calcium ($CA^{++}$) and sodium chloride (NaCl) concentrations of synthetic brines. Results of tests with various surfactant combinations (0.3 percent of each), at selected Ca$^{++}$ and NaCl concentrations, are presented in FIG. 3. Surfactant compositions were as follows:
1. SA-597 = ammonium dodecylbenzene sulfonate
2. SA-697 = ammonium tridecylbenzene sulfonate
3. SN-40 = sulfated 4 mole ethylene oxide adduct of nonyl phenyl
4 SN-60 = sulfated 6 mole ethylene oxide adduct of nonyl phenol Preliminary testing indicated that surfactant systems containing SA-597 were relatively ineffective in NaCl brines when the CA$^{++}$ concentration was below 2000 ppm; consequently, only the results for SA-697 are plotted in FIGS. 3A–D. At Ca$^{++}$ concentrations of 3000 ppm and 4500 ppm (FIGS. 3E–F), data for SA-597 and SA-697 are presented.

The tests indicated that relatively rapid displacement of crude from thin tubes could be obtained, in synthetic brines of widely varying Ca$^{++}$ and NaCl concentrations, by selection of the appropriate dual surfactant system.

Figure 4:
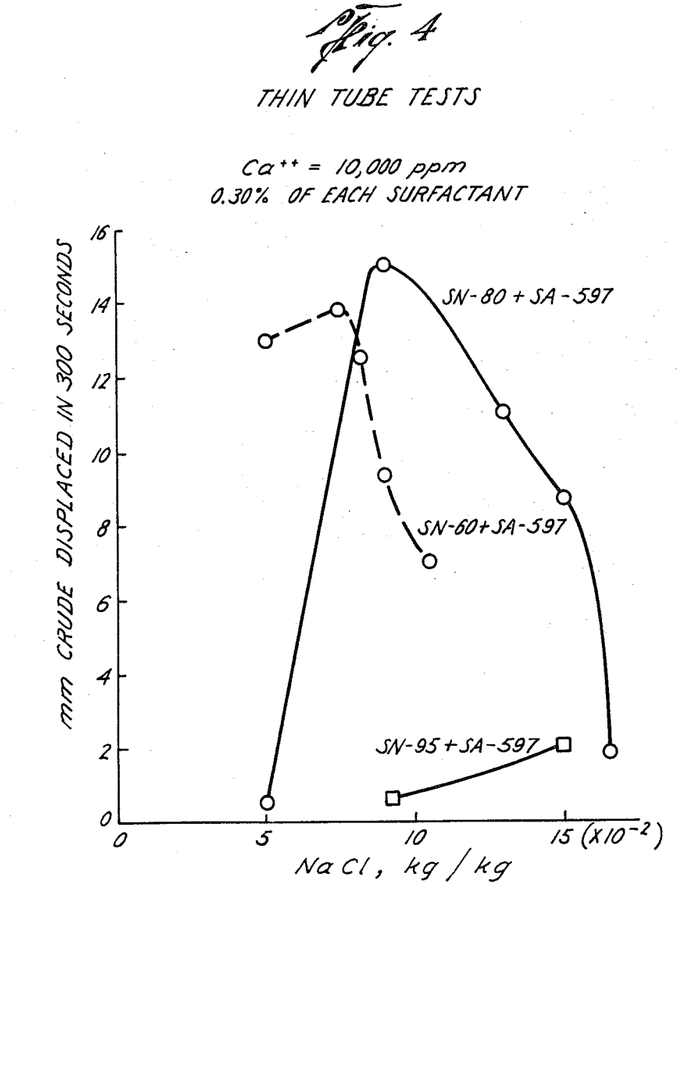
FIGS. 4 and 5 depict the effect on capillary displacement of high concentrations of calcium and sodium ions.
Figure 5:
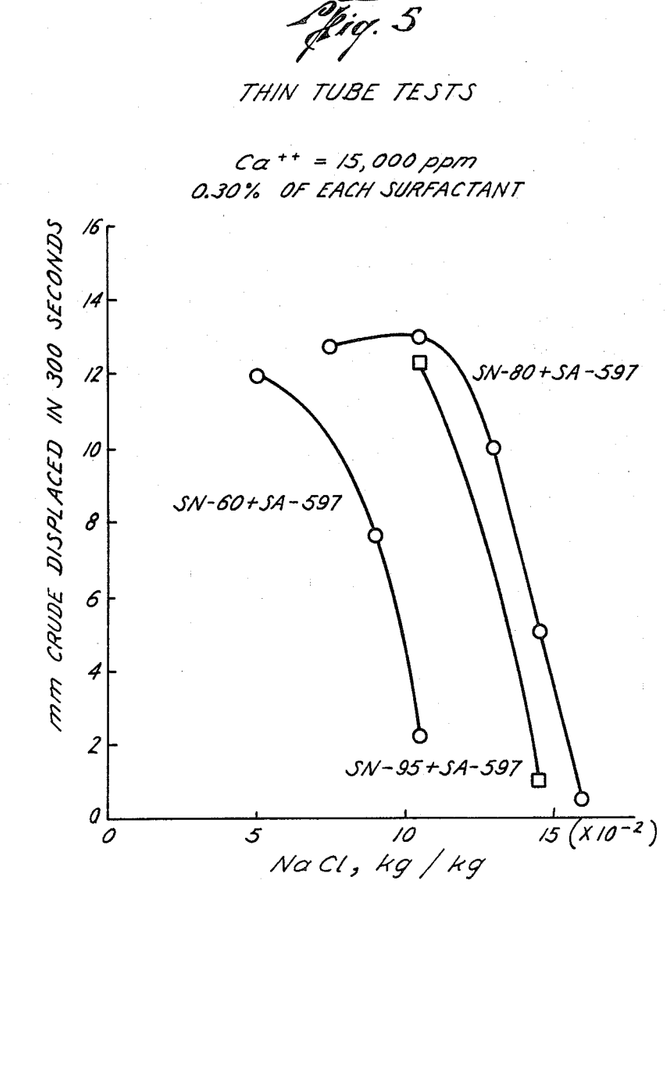

FIGS. 4 and 5 show the displacement of crude oil from thin tubes by surfactants in the presence of brines with relatively high concentrations of calcium and sodium chloride. Results of tests with 10,000 ppm and 15,000 ppm calcium are presented in FIGS. 4 and 5, respectively. The surfactants used were as follows:
a. SN-60, SN-80, and SN-95 = sulfated 6 mole ethylene oxide adduct of nonyl phenol, 8 mole ethylene oxide adduct of nonyl phenol and 9.5 mole ethylene oxide adduct of nonyl phenol, respectively.
b. SA-597 = ammonium salt of dodecylbenzene sulfonic acid The degree of ethoxylation of the sulfated surfactants was found to influence crude oil displacement rate. With SN-60 and SN-80, the degree of ethoxylation required for maximum displacement increased as the brine hardness and salinity increased; however, SN-95 was less effective than SN-80 within the concentration ranges studied.

We have demonstrated that aqueous solutions of a combination of surfactants, namely water soluble salts of an alkyl or alkylaryl sulfonates and sulfated oxyalkylated surfactants containing arylalkyl groups perform efficiently in hard water systems whereas either used alone does not exhibit surfactant properties.

We claim:
1. In a method for recovering petroleum from a subterranean formation penetrated by at least one injection well and at least one production well, said formation containing water having polyvalent ions dissolved therein in a concentration of from about 200 to about 18,000 parts per million, said recovery method being of the type wherein an aqueous fluid is injected into the formation via the injection well, and oil displaced by the injected fluid is recovered from the formation via the production well, wherein the improvement comprises injecting into the formation an aqueous surfactant solution comprising:
   a. a surfactant with an average molecular weight not to exceed about 360 selected from the group consisting of water soluble salts of alkyl sulfonates having from five to 25 carbon atoms, and water soluble salts of alkylaryl sulfonates wherein the alkyl chains have from five to 25 carbon atoms.
   b. a sulfonated oxyalkylated surfactant containing alkylaryl groups.

2. A method as in claim 1 wherein the cation associated with the salts of the sulfonate is selected from the group consisting of sodium, potassium and ammonium.

3. A method as is claim 2 wherein the cation is ammonium.

4. A method as in claim 2 wherein the cation is sodium.

5. A method as in claim 1 wherein the cation associated with the sulfated surfactant is selected from the group consisting of sodium, potassium and ammonium.

6. A method as in claim 5 wherein the cation is ammonium.

7. A method as in claim 5 wherein the cation is sodium.

8. A method as in claim 1 wherein the sulfonated surfactant has the formula $$[R-X] Y$$

wherein R is an alkyl radical, linear or branched, having from five to 25 carbon atoms, X is an oxygen containing anionic radical, a sulfonate and Y is a monovalent cation such as sodium, potassium or ammonium, or the formula $$R-\bigcirc-XY$$

wherein R, X and Y have the same meaning as above and the sulfated oxyalkylated surfactant has the formula $$R'-\bigcirc-(CH_2-CH_2O)_N OSO_3W$$

wherein R' is an alkyl radical having from five to 20 carbon atoms, N is an integer from 1 to 10, and W is a cation such as sodium, potassium or ammonium.

9. A method as in claim 8 wherein the surfactant mixture comprises a salt of an alkyl substituted benzene sulfonic acid and a sulfated ethylene oxide adduct of nonyl phenol.

10. A method as in claim 9 wherein the sulfonate is a salt of dodecylbenzene sulfonic acid.

11. A method as in claim 9 wherein the sulfonate is a salt of tridecylbenzene sulfonic acid.

12. A method as in claim 8 wherein the sulfonate and the sulfated surfactants are each present in amounts ranging from about 0.2 to 0.5 weight percent.

13. A method as in claim 8 wherein the ratio of sulfonates to sulfates surfactant is from about 8 to 1 or 1 to 8.

14. A method as in claim 1 wherein the aqueous surfactant solution has dissolved therein a hydrophilic polymer in sufficient quantity to increase the viscosity of the aqueous surfactant solution.

15. A method as in claim 14 wherein the aqueous surfactant solution is preceded by sacrificial material to lessen adsoprtion of the surfactants and/or polymer.

16. A method as in claim 15 wherein the sacrificial material is an organic or inorganic water soluble salt.

17. A method as in claim 1 wherein the aqueous surfactant solution is followed by an aqueous polymer solution of viscosity greater than water.

18. A method as in claim 1 wherein the aqueous surfactant solution is followed by a gas.

19. A method as in claim 18 wherein the gas is in combination with an aqueous fluid.

20. A method as in claim 19 wherein the gas containing aqueous fluid contains sufficient polymer to increase viscosity.

21. A method as in claim 1 wherein the aqueous surfactant solution is preceded by sacrificial material to lessen adsorption of the surfactants.

22. A method as in claim 21 wherein the sacrificial material is an organic or inorganic water soluble salt.

23. A method as in claim 1 wherein the aqueous surfactant solution has polyvalent inorganic ions present.

* * * * *